Figure 4:
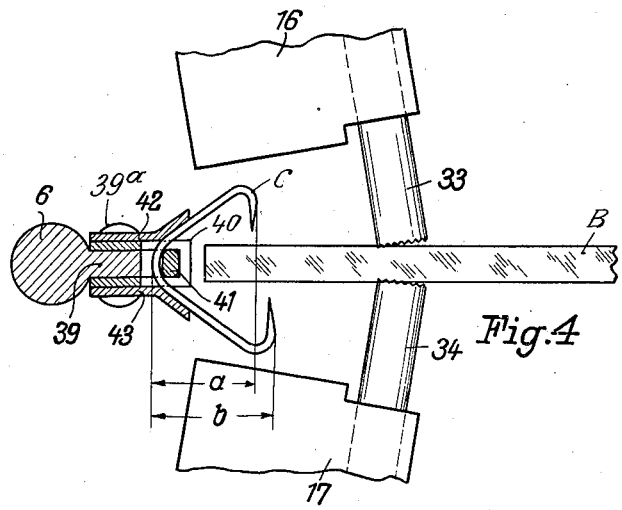

Sept. 16, 1941.  C. MATTHAEI  2,255,855
DEVICE FOR ATTACHING BELT HOOKS
Filed March 7, 1939  5 Sheets-Sheet 1
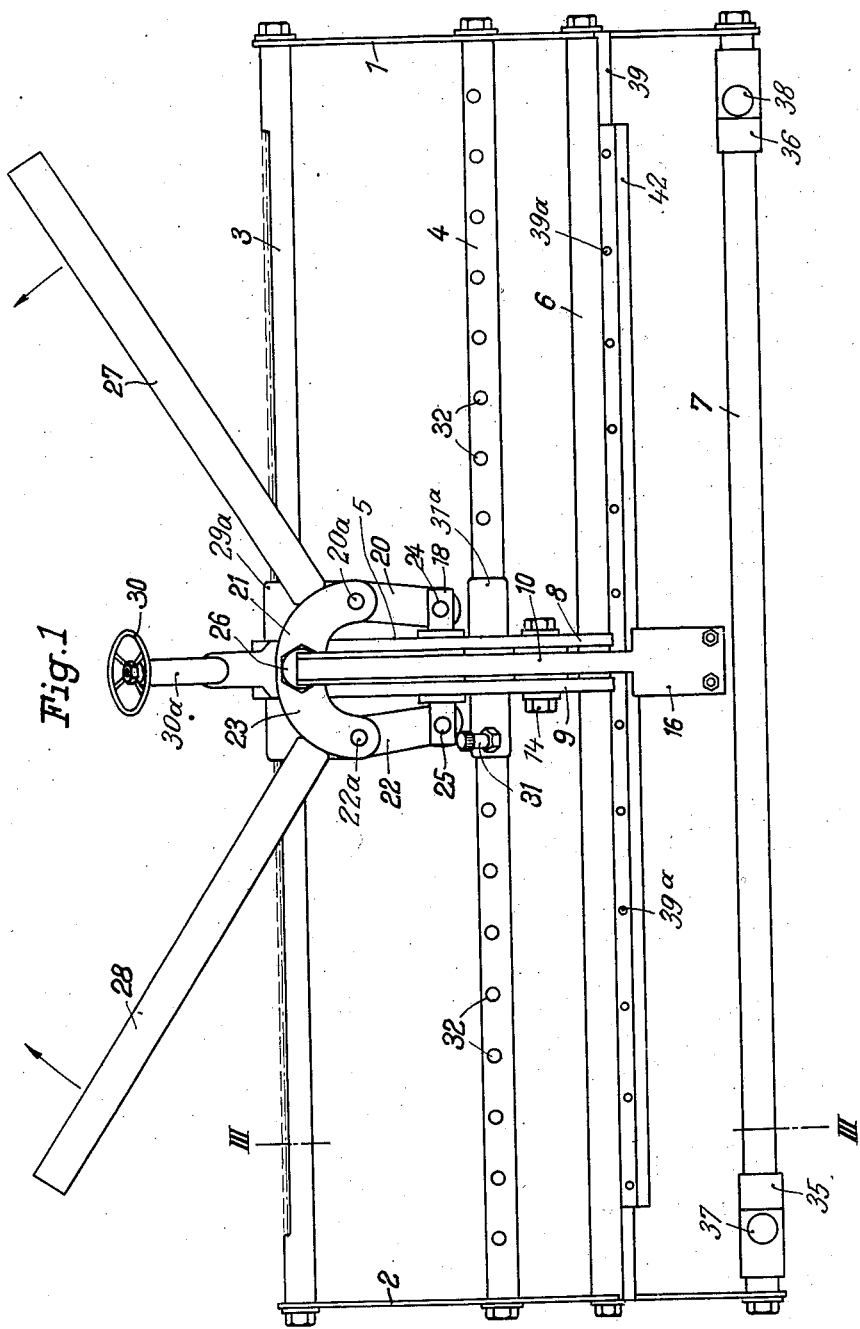
Inventor:
CURT MATTHAEI
BY: Haseltine, Lake & Co.
Attorneys

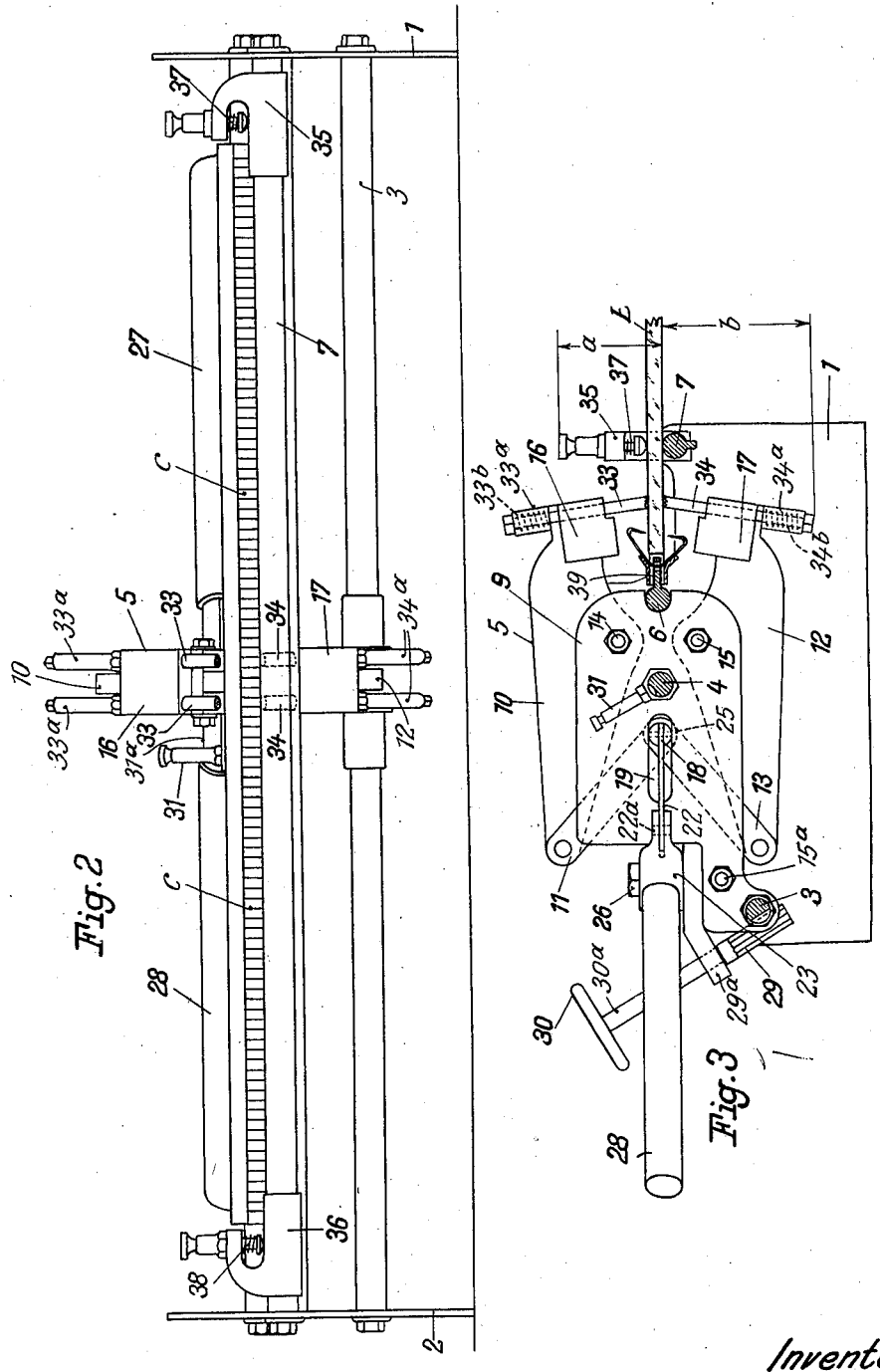

Inventor:
CURT MATTHAEI
BY: Haseltine, Lake & Co.
Attorneys

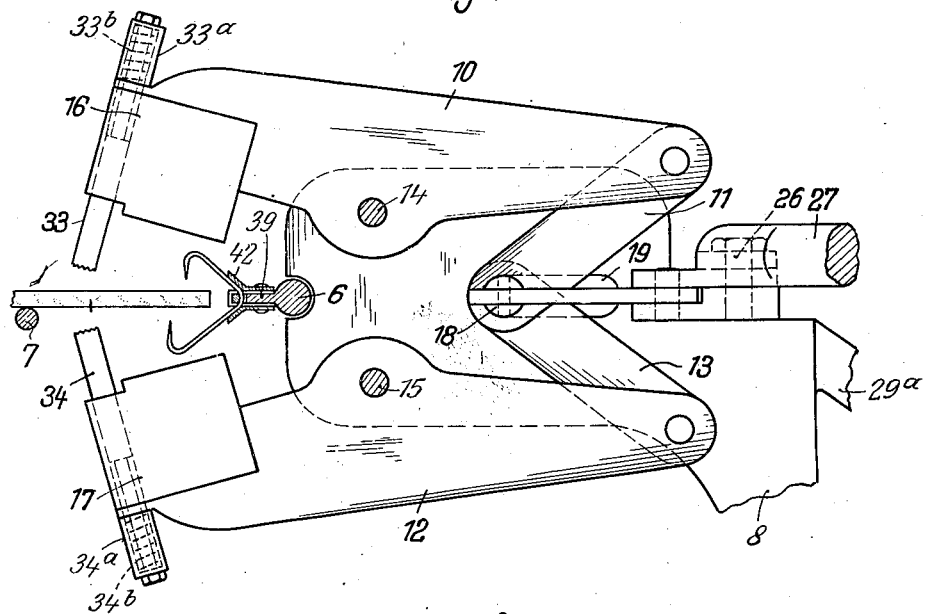
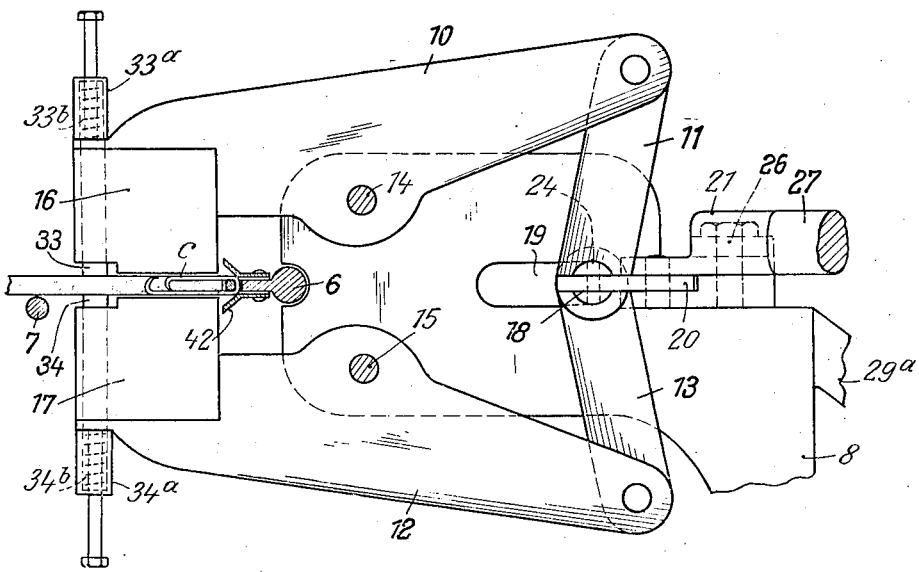

Sept. 16, 1941.　　　C. MATTHAEI　　　2,255,855
DEVICE FOR ATTACHING BELT HOOKS
Filed March 7, 1939　　　5 Sheets-Sheet 5

Inventor:
CURT MATTHAEI
BY: Haseltine, Lake & Co.
Attorneys

Patented Sept. 16, 1941

2,255,855

UNITED STATES PATENT OFFICE 2,255,855

DEVICE FOR ATTACHING BELT HOOKS

Curt Matthaei, Offenbach-on-the-Main, Germany

Application March 7, 1939, Serial No. 260,442
In Germany March 9, 1938

11 Claims. (Cl. 1—49.4)

The present invention relates to devices for attaching belt hooks to belts more particularly for attaching hooks to conveyer belts used for underground transport of coal, ores and the like. The invention is concerned with a device of this kind in which the end of the belt is firmly pressed against a means holding the belt hooks and in which the belt hooks inserted into a holding comb are attached to the end of the belt by presser jaws adapted to be swung against each other and thereby against the belt. In known devices of this kind the entire width of the end of the belt is clamped between a supporting rail and an upper clamping rail. To obtain a still better forcing of the end of the belt against the means holding the belt hooks laterally acting screws are provided on the frame of the machine by means of which the belt together with the clamping rails is firmly clamped against the holding means.

According to the invention the heavy holding- and pressing means are dispensed with which are of a relatively complicated construction and therefore render difficult the operation of the entire device. The invention substantially consists therein that spring-pressed means, i. e. means for gripping the belt, are mounted on the presser jaws themselves so that if the jaws are swung about their pivots during closing, the spring-pressed means carried by them perform a path in the direction towards the holding comb and thereby force the gripped belt towards the holding comb. Slides holding the lateral edges of the belt are adjustably mounted upon the supporting rail of the belt, said slides carry resilient bolts engaging the lateral edges of the belt and holding the end of the belt in the correct position upon the supporting rail. To warrant a uniform application of the belt hooks over the entire width of the belt in such a manner as to relieve the front edge of the belt of stresses tending to lift it off the holding comb, two oppositely arranged rails forming a trough are provided according to the invention at the holding comb. In this trough the belt hooks may be centered upon a holding pin inserted into the holding comb. The space in the holding comb receiving the holding pin is, moreover, so formed that the curved vortex of the belt hooks may lift off the holding pin during the attaching operation and that at the end of this operation the vortex of the hooks bears against the inner surface of the holding comb, so that during the application of the belt hooks the latter cannot exert a harmful action upon the end of the belt.

The invention further relates to a device for attaching belt hooks provided with a lever drive in which the belt hooks inserted into the holding comb are in a step-like manner attached to the belt over the entire width of the latter by means of the presser jaws.

The known devices of this kind were so constructed that a pair of toggle-levers was actuated by means of a rotatable spindle capable of straightening or opening said toggle, or a cam member also capable of straightening the toggle when operated by a ratchet and pawl drive and a handle. The handle or hand lever was moved parallel to the edge of the belt to be provided with belt hooks. Devices for attaching belt hooks are, moreover, known in which the step-like attaching of the belt hooks is effected by a pincer action by means of two handles vertically moved against each other. When employing such devices for attaching belt hooks underground where often a slight height of space only is available, the operation of such device is rendered difficult by the fact that the physical effort required for reciprocating the hand lever or for closing the levers acting like a pair of pincers can be utilized rather unfavorably only.

The object of the invention is to so construct such devices for attaching belt hooks that in a very limited space, particularly in a space of very slight height, a simple and safe operation is possible, fully and easily utilizing the physical effort so that relatively slight physical efforts are sufficient to produce a very powerful pressure of the jaws upon the belt hooks.

According to the invention this object is obtained by linking a second pair of toggle-levers, operating in the plane of the belt, to the connecting pin of the pair of toggle-levers operating in a plane vertically to that of the belt. Each of the shanks swingably mounted about a fixed shaft carries a handle. Preferably the second pair of toggle-levers is swingably mounted about a common fixed shaft or bolt arranged in the operating plane of the first pair of toggle-levers. In a manner known both pairs of toggle-levers are journalled in a carriage which may be horizontally displaced by a lateral feeding device. One of the guides of the carriage may, for this purpose, be formed as a rack with which cooperates a pinion mounted on the carriage, whereas the other guide of the carriage is formed as a stop for a locking device, for instance a spring-loaded bolt, mounted in the carriage.

In the accompanying drawings, a device for attaching belt hooks according to the invention is diagrammatically shown by way of example.

Figure 9:
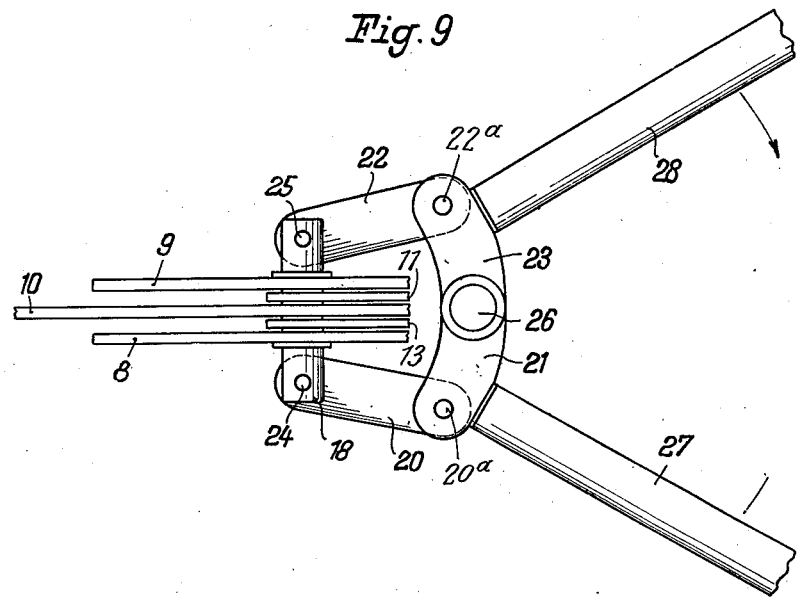
Figure 10:
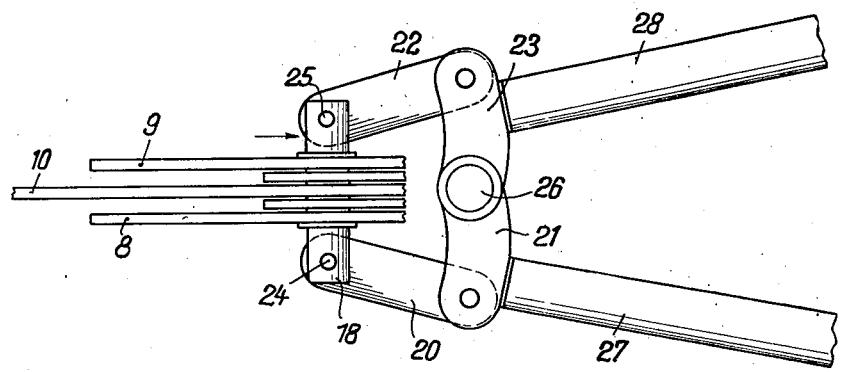

In these drawings:

Fig. 1 is a plan view of a device for attaching belt hooks to belts constructed in accordance with the invention, Fig. 2 is a front elevation of the device shown in Fig. 1, Fig. 3 is a section on the line III—III of Fig. 1, Figs. 4, 5 and 6 are side elevations on a larger scale partly also in section on the line III—III of Fig. 1, showing three different operative positions of the presser jaws, carrying the spring-pressed means gripping the belt, and of the holding comb, Fig. 7 is a side elevation of the toggle-lever systems on a larger scale, Fig. 8 is a side elevation of the same detail showing the individual parts in another position, Fig. 9 is a detail plan view of the manual levers, and Fig. 10 is a plan view similar to that of Fig. 9 showing the individual parts in another operative position.

As may be seen from Figs. 1 to 3, the device according to the invention illustrated by way of example comprises two side frames 1 and 2 which are connected together by a plurality of rods. The rods 3 and 4 serve as guides for a carriage 5. The rod 6 is formed as a holding comb for receiving the belt hooks C. The holding comb may, however, also be carried by the rod 6. The rod 7 serves as support for the belt B.

The carriage 5 shown in the drawings comprises two vertical plates 8 and 9 provided with guide sleeves or the like for the rods 3 and 4 respectively.

A pair of toggle-levers 10, 11 and 12, 13 respectively is arranged between the plates 8 and 9. The upper pair of toggle-levers 10, 11 and the lower pair of toggle-levers 12, 13 are fulcrumed upon bolts 14 and 15 respectively. The bolts 14 and 15 are journalled in the plates 8 and 9. The free ends of the swingable levers 10 and 12 of each pair of toggle-levers carry presser jaws 16 and 17 respectively. The levers 11 and 13 of the two pairs of toggle-levers are connected together by a bolt 18 guided in horizontal slots 19 provided in the two plates 8 and 9. If the jaws are opened the bolt 18 occupies a position at the end of the slots 19 facing the belt.

A second pair of toggle-levers 20, 21 and 22, 23 respectively is linked to the connecting bolt 18 of the pair of toggle-levers 10, 11 and 12, 13 respectively operating in a vertical plane. This second pair of toggle-levers operates in a horizontal plane and is linked to said bolt 18 for instance by vertical pins 24 and 25 respectively which as shown in Figs. 1, 9 and 10 are carried by the bolt 18. In the construction shown, the pair of toggle-levers 20, 21 and 22, 23 respectively is swingably mounted upon a fixed pivot 26 arranged in the operating plane of the first pair of toggle-levers 10, 11 and 12, 13 respectively. It is, however, also possible to provide a special pivot for each toggle-lever 20, 21 and 22, 23 respectively of the second pair of toggle-levers. The shanks or levers 21 and 23 of the second pair of toggle-levers, which are swingably mounted upon a fixed pivot 26 are linked to the shanks 20 and 22 by pivots 20a and 22a and carry detachable handles 27, 28 respectively.

At the rear end of the carriage 5 a pinion 29 is mounted at the lower end of a shaft 30a rotatably arranged in the inclined rear portion of a bracket 29a as shown at the left hand side in Fig. 3. This pinion engages teeth formed on the rod 3. The pinion 29 may be rotated by a hand wheel 30 fixed to the free end of the shaft 30a. The carriage 5 thereby is shifted either towards the right or towards the left. Preferably, a locking device is arranged in the carriage 5 to warrant shifting of the latter always for a distance equal to the width of the jaws 16, 17 only. This locking device for instance may consist of a spring-loaded bolt 31 arranged in a lug 31a at the left of the carriage 5 and adapted to engage corresponding notches or recesses 32 provided in the rod 4.

Spring-pressed means are arranged at the presser jaws 16, 17 and in the construction shown each jaw carries two bolts 33, 34 respectively. Each of these bolts is mounted to slide in a suitable bore of the corresponding jaw. The lower end of the bolts 33, 34 is grooved, knurled or otherwise roughened to obtain a better grip on the upper surface of the belt B. The upper end of each bolt projects beyond its bore in the presser jaw and is surrounded by a casing 33a and 34a respectively containing a spring 33b and 34b respectively for forcing the bolt against the belt B.

The rod 7 mentioned already above carries two slides 35 and 36 provided with spring-controlled bolts 37 and 38 respectively as may be seen from Figures 1 and 3. These spring-controlled bolts 37 and 38 are adapted to seize the lateral edges of the belt B and to hold the end thereof in the correct position upon the rod 7.

The device holding the belt hooks comprises the rod 6 provided with a flange-like extension or projection 39. The U-shaped holding comb 40 provided with transverse slots is fitted over the extension or projection 39 in such a manner that a substantial distance remains between the front edge of the projection 39 and the surface of the holding comb proper against which a pin 41 adapted to hold the belt hooks in position may bear.

At both sides of the holding comb 40 proper angular rails 42, 43 are secured to the projection 39 by rivets 39a. Said rails forming a trough in which, as shown in Fig. 4, the belt hooks may be centered upon the holding pin 41 inserted into the space limited by the holding comb 40 and the projection 39.

The operation of the device according to the invention is as follows:

After the holding comb 40 has been provided with a supply of belt hooks corresponding to the width of the belt, the end of the belt is led upon the rod 7. The spring-controlled bolts 37 and 38 carried by the slides 35 and 36 then seize the lateral edges of the belt B and hold the end thereof in the correct position upon the rod 7. The end of the belt finally enters the trough formed by the belt hooks assembled in the holding comb 40.

The operator then seizes with both his hands the handles 27 and 28 and presses same together in the direction of the arrows shown in Fig. 1. By means of the pair of toggle-levers 20, 21 and 22, 23 the bolt 18 is drawn rearwardly, thereby swinging the pair of toggle-levers 10, 11 and 12, 13 respectively in such a manner that as shown in Fig. 8 the jaws 16, 17 approach each other and the belt hooks are pressed into the belt in the usual manner and eventually the points of the hooks are deformed in the manner of rivets.

If the width of the belt exceeds that of the presser jaws as this is generally the case, the belt hooks are attached in a step-like manner. At the beginning of the attaching operation the carriage 5 is shifted to the one end of the belt and is then fed by the gearing 3, 29, 30 along the entire edge of the belt as often as may be required to attach all the belt hooks.

Figure 5:
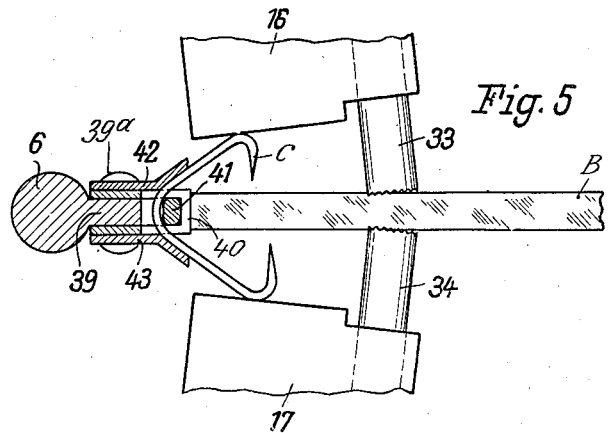
Figure 6:
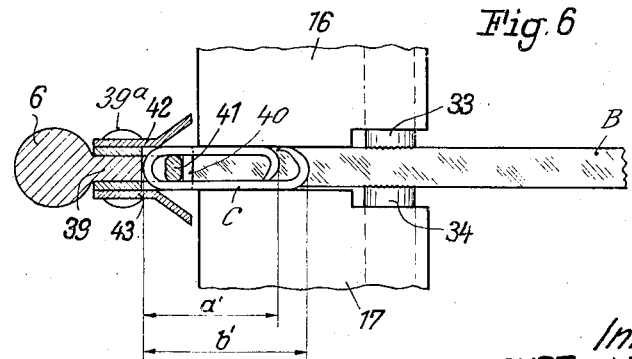

If the presser jaws 16, 17 are pressed together by means of the handles 27, 28, the spring-pressed bolts 33, 34 first come into engagement with the belt (Fig. 5). On further compression of the jaws the bolts 33, 34 are pushed into the presser jaws and due to the swinging movement of the arms of the toggle-levers carrying the jaws the front edge of the belt is firmly drawn against the outer front edge of the holding comb 40. As soon as the presser jaws 16, 17 come into contact with the shanks of the belt hooks, the operation of attaching the belt hooks begins. During this attaching operation the spring-pressed bolts 33, 34 tend to always force the end of the belt B more firmly against the holding comb 40. Simultaneously the points of the belt hooks are attached to the end of the belt pressed against the holding comb and, as indicated in Fig. 6, the points of the hooks are deformed in the manner of rivets, provided they are of sufficient length with regard to the thickness of the belt.

During the attaching operation a further essential feature results which is due to the particular construction of the holding comb 40. Before the belt hooks are compressed the vortex of the latter bears with the inner side against the holding pin 41, whereas the outer edges of the shanks of the belt hooks bear against the angular rails 42, 43. The vertical projection from the vortex of the belt hook to the ends of the points of the hook for the shorter shank of the belt hook has the value $a$ and for the longer shank the value $b$ (Fig. 4). If now the belt hooks are gradually pressed into to the belt, their vortex is lifted off the holding pin 41 and finally the belt hooks reach the position shown in Fig. 6 in which their vortex bears against the front edge of the extension or projection 39. The vertical projection from the vortex of the belt hook to the points then for the shorter shank has the value $a'$ and for the longer shank the value $b'$ (Fig. 6). The value $a'$ being greater than the value $a$ and the value $b'$ also being greater than the value $b$.

In the known devices this difference between the values $a'$ and $a$ and $b'$ and $b$ respectively has been one reason for the fact that the end of the belt always was pressed off the holding comb. Due to the fact that with the use of the known devices the vortex of the belt hooks could not be lifted off the holding pin during the attaching operation, the hook points entering the belt acted in the sense of increasing the values $a$ and $b$ to the values $a'$ and $b'$ respectively, thereby giving rise to the formation of a pressure component which tended to force the belt away from the holding comb 40.

By arranging the spring-pressed bolts 33, 34 on the presser jaws 16, 17 and by the special formation of the holding comb 40 according to the invention the drawbacks occurring hitherto during the attaching operation are reliably removed with the use of very simple means.

The invention has the further advantage that the hitherto required heavy U- or T-shaped holding- and clamping-rails for the end of the belt are completely dispensed with. Hereby the mode of operation of the device and its handling are simplified. In contradistinction to the hitherto used mode of operation, it is with the new device required only to insert the lateral edges of belt into the slides 35, 36. During the operation of attaching the belt hooks, the belt is then drawn in and held by the spring-pressed bolts 33, 34. The pressure of the spring-loaded bolts 37 and 38 carried by the slides 35 and 36 respectively is so calculated that the belt is reliably held by means of the two spring-pressed bolts, however, the zone of the two lateral edges of the belt may nevertheless be drawn towards the holding comb 40.

What I claim is:

1. A device for attaching belt hooks to belts, comprising means for holding said belt hooks including a holding pin adapted to cooperate with said means for holding said belt hooks, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, and spring-pressed means arranged on each presser jaw, the arrangement being such that during movement of the presser jaws towards each other and before said jaws come into contact with said belt hooks said spring-pressed means swing around the pivots of the corresponding presser jaws and in their pivotal movement move inwardly relative to the holding means to press the end of the belt against said holding means.

2. A device for attaching belt hooks to belts, comprising means for holding said belt hooks including a holding pin adapted to cooperate with said means for holding said belt hooks, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

3. A device for attaching belt hooks to belts, comprising means for holding said belt hooks including a holding pin adapted to cooperate with said means for holding said belt hooks, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

4. A device for attaching belt hooks to belts, comprising a frame, a belt-supporting rod on said frame, slides adjustably arranged on said belt-supporting rod, a spring-controlled bolt in each of said slides for holding the belt near its sides, means on said frame for holding said belt hooks including a holding pin adapted to cooperate with said means for holding said belt hooks, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt provided with a roughened operative end arranged on each presser jaw, the arrangement being such that during movement of the presser jaws towards each other and before said jaws come into contact with said belt hooks said spring-pressed bolts swing around the pivot of the corresponding presser jaws and in their pivotal movement move inwardly relative to the holding means to press the end of the belt against said holding means.

5. A device for attaching belt hooks to belts, comprising means for holding said belt hooks including a holding pin adapted to cooperate with said means for holding said belt hooks, said holding means presenting a space in which the vortex of said belt hooks may move while said hooks are folded against the belt, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

6. A device for attaching belt hooks to belts, comprising means for holding said belt hooks including a holding pin adapted to be inserted in the space provided in the holding means for receiving the vortex of said belt hooks, an abutment at one end of the space for arresting the vortex of the belt hooks when the folding operation has been completed, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt provided with a roughened operative end arranged on each presser jaw, the arrangement being such that during movement of the presser jaws towards each other and before said jaws come into contact with said belt hooks said spring-pressed bolts swing around the pivot of the corresponding presser jaws and in their pivotal movement move inwardly relative to the holding means to press the end of the belt against said holding means.

7. A device for attaching belt hooks to belts, comprising means for holding said belt hooks including a holding pin adapted to cooperate with said means for holding said belt hooks, members provided at the upper and the lower side of the holding means which converge away from the end of the belt for centering said belt hooks, means for holding the end of a belt, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

8. A device for attaching belt hooks to belts, comprising means for holding said belt hooks including a holding pin adapted to cooperate with said means for holding said belt hooks, means for holding the end of a belt, a pair of presser jaws, a vertical system of toggle-levers and links for moving said presser jaws towards the belt in opposite directions for folding said belt hooks against the upper and lower surfaces of the belt, a horizontal system of toggle-levers and links, means operatively connecting the two systems of toggle-levers and links, manual means for operating the horizontal system of toggle-levers and links, and a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

9. A device for attaching belt hooks to belts, comprising means for holding said belt hooks including a holding pin adapted to cooperate with said means for holding said belt hooks, means for holding the end of a belt, a pair of presser jaws, a vertical system of toggle-levers and links for moving said presser jaws towards the belt in opposite directions for folding said belt hooks against the upper and lower surfaces of the belt, a fixed pivot pin, a pair of horizontal toggle-levers mounted to swing about said pivot pin, a handle for manual operation on each horizontal toggle-lever, a link connecting each horizontal toggle-lever to said vertical system of toggle-levers and links, and a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

10. A device for attaching belt hooks to belts, comprising a frame, means provided on said frame for holding said belt hooks including a holding pin adapted to cooperate with said means for holding said belt hooks, means for holding the end of a belt, a carriage mounted to slide on said frame, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means.

11. A device for attaching belt hooks to belts, comprising a frame, means provided on said frame for holding said belt hooks including a holding pin adapted to cooperate with said means for holding said belt hooks, means for holding the end of a belt, a carriage mounted to slide on said frame, a pair of presser jaws mounted on pivots arranged above and below the plane of said belt respectively, means for moving said presser jaws in opposite directions towards the belt for folding said belt hooks against the upper and lower surfaces of the belt, and a spring-pressed bolt provided with a roughened operative end arranged on each presser jaw, the arrangement being such that during movement of the presser jaws towards each other and before said jaws come into contact with said belt hooks said spring-pressed bolts swing around the pivots of the corresponding presser jaws and in their pivotal movement move inwardly relative to the holding means to press the end of the belt against said holding means, and a spring-loaded bolt for arresting said carriage in definite positions on said frame.

CURT MATTHAEI.